(12) United States Patent
Beauchamp et al.

(10) Patent No.: US 7,401,158 B2
(45) Date of Patent: Jul. 15, 2008

(54) APPARATUS AND METHOD FOR INSTANT MESSAGING COLLABORATION

(75) Inventors: Tim J. Beauchamp, Belmont, CA (US); Geoffrey D. Nicholls, Palo Alto, CA (US)

(73) Assignee: Oracle International Corporation, Redwood Shores, CA (US)

( * ) Notice: Subject to any disclaimer, the term of this patent is extended or adjusted under 35 U.S.C. 154(b) by 495 days.

(21) Appl. No.: 10/289,162

(22) Filed: Nov. 5, 2002

(65) Prior Publication Data

US 2004/0054802 A1 Mar. 18, 2004

Related U.S. Application Data

(60) Provisional application No. 60/410,989, filed on Sep. 16, 2002.

(51) Int. Cl.
*G06F 15/16* (2006.01)
*G06F 15/173* (2006.01)

(52) U.S. Cl. .................. 709/238; 709/207; 709/224

(58) Field of Classification Search .............. 709/238, 709/239, 248, 224, 206, 207
See application file for complete search history.

(56) References Cited

U.S. PATENT DOCUMENTS

| | | | |
|---|---|---|---|
| 5,033,009 A | 7/1991 | Dubnoff | |
| 5,510,980 A | 4/1996 | Peters | |
| 5,553,215 A | 9/1996 | Kaethler | |
| 5,592,608 A | 1/1997 | Weber et al. | |
| 5,613,131 A | 3/1997 | Moss et al. | |
| 5,615,362 A | 3/1997 | Jensen et al. | |
| 5,654,726 A * | 8/1997 | Mima et al. | 345/2.2 |
| 5,721,847 A | 2/1998 | Johnson | |
| 5,754,774 A | 5/1998 | Bittinger et al. | |
| 5,758,337 A | 5/1998 | Hammond | |
| 5,765,164 A | 6/1998 | Prasad et al. | |
| 5,778,372 A | 7/1998 | Cordell et al. | |

(Continued)

FOREIGN PATENT DOCUMENTS

WO WO 01/63466 A2 8/2001

OTHER PUBLICATIONS

"Report of Novelty Search", PATENTEC, dated Apr. 4, 2004.

(Continued)

*Primary Examiner*—Saleh Najjar
*Assistant Examiner*—Vital Korobov
(74) *Attorney, Agent, or Firm*—Townsend and Townsend and Crew LLP

(57) ABSTRACT

An apparatus and method for instant message transmission includes a message center coupled to one or more servers and to an event engine by a network. An instant message is transmitted to the message center by the event engine over the network. An algorithm determines the optimum path for the transmission of the instant message. Users may share identical data via instant messaging, and may make changes to the data as it is streamed in real-time to designated users over the network. It is emphasized that this abstract is provided to comply with the rules requiring an abstract that will allow a searcher or other reader to quickly ascertain the subject matter of the technical disclosure. It is submitted with the understanding that it will not be used to interpret or limit the scope or meaning of the claims. 37 CFR 1.72(b).

12 Claims, 8 Drawing Sheets

U.S. PATENT DOCUMENTS

| | | |
|---|---|---|
| 5,781,911 A | 7/1998 | Young et al. |
| 5,784,275 A | 7/1998 | Sojoodi et al. |
| 5,787,409 A | 7/1998 | Seiffert et al. |
| 5,809,267 A | 9/1998 | Moran et al. |
| 5,812,840 A | 9/1998 | Sxhwartz |
| 5,831,609 A | 11/1998 | London et al. |
| 5,831,615 A | 11/1998 | Drews et al. |
| 5,857,201 A | 1/1999 | Wright, Jr. et al. |
| 5,862,325 A | 1/1999 | Reed et al. |
| 5,864,669 A | 1/1999 | Osterman et al. |
| 5,890,174 A | 3/1999 | Khanna et al. |
| 5,893,126 A | 4/1999 | Drews et al. |
| 5,898,434 A | 4/1999 | Small et al. |
| 5,918,009 A | 6/1999 | Gehani et al. |
| 5,922,044 A | 7/1999 | Banthia |
| 5,926,177 A | 7/1999 | Hatanaka et al. |
| 5,928,327 A | 7/1999 | Wang et al. |
| 5,930,794 A | 7/1999 | Linenbach et al. |
| 5,943,620 A | 8/1999 | Boltz et al. |
| 5,974,236 A * | 10/1999 | Sherman .................... 709/221 |
| 6,023,694 A | 2/2000 | Kouchi et al. |
| 6,025,844 A | 2/2000 | Parsons |
| 6,035,324 A | 3/2000 | Chang |
| 6,038,558 A | 3/2000 | Powers et al. |
| 6,055,548 A | 4/2000 | Comer et al. |
| 6,070,197 A | 5/2000 | Cobb et al. |
| 6,073,242 A | 6/2000 | Hardy et al. |
| 6,075,530 A | 6/2000 | Lucas et al. |
| 6,088,481 A | 7/2000 | Okamoto et al. |
| 6,092,102 A | 7/2000 | Wagner |
| 6,094,681 A | 7/2000 | Shaffer et al. |
| 6,112,236 A | 8/2000 | Dollin et al. |
| 6,141,659 A | 10/2000 | Barker et al. |
| 6,170,019 B1 | 1/2001 | Dresel et al. |
| 6,175,859 B1 | 1/2001 | Mohler |
| 6,182,116 B1 | 1/2001 | Namma et al. |
| 6,185,582 B1 | 2/2001 | Zellweger et al. |
| 6,189,069 B1 | 2/2001 | Pares et al. |
| 6,201,539 B1 | 3/2001 | Miller et al. |
| 6,204,846 B1 | 3/2001 | Little et al. |
| 6,205,474 B1 | 3/2001 | Hurley |
| 6,208,990 B1 | 3/2001 | Suresh et al. |
| 6,233,578 B1 | 5/2001 | Machihara et al. |
| 6,239,797 B1 | 5/2001 | Hills et al. |
| 6,240,444 B1 | 5/2001 | Fin et al. |
| 6,243,698 B1 | 6/2001 | Powers et al. |
| 6,243,713 B1 | 6/2001 | Nelson et al. |
| 6,256,649 B1 | 7/2001 | Mackinlay et al. |
| 6,256,676 B1 | 7/2001 | Taylor et al. |
| 6,269,393 B1 | 7/2001 | Yost et al. |
| 6,292,803 B1 | 9/2001 | Richardson et al. |
| 6,301,601 B1 | 10/2001 | Helland et al. |
| 6,304,546 B1 | 10/2001 | Natarajan et al. |
| 6,314,463 B1 | 11/2001 | Abbott et al. |
| 6,317,737 B1 | 11/2001 | Gorelik et al. |
| 6,336,135 B1 | 1/2002 | Niblett et al. |
| 6,341,312 B1 | 1/2002 | French et al. |
| 6,348,933 B1 | 2/2002 | Walls et al. |
| 6,363,363 B1 | 3/2002 | Haller et al. |
| 6,393,421 B1 | 5/2002 | Paglin |
| 6,397,217 B1 | 5/2002 | Melbin |
| 6,430,576 B1 | 8/2002 | Gates et al. |
| 6,449,344 B1 | 9/2002 | Goldfinger et al. |
| 6,467,052 B1 | 10/2002 | Kaler et al. |
| 6,480,847 B1 | 11/2002 | Linenbach et al. |
| 6,510,457 B1 | 1/2003 | Ayukawa et al. |
| 6,513,047 B1 | 1/2003 | Talley |
| 6,519,568 B1 | 2/2003 | Harvey et al. |
| 6,523,046 B2 | 2/2003 | Liu et al. |
| 6,532,465 B2 | 3/2003 | Hartley et al. |
| 6,535,227 B1 | 3/2003 | Fox et al. |
| 6,542,165 B1 | 4/2003 | Ohkado |
| 6,567,796 B1 | 5/2003 | Yost et al. |
| 6,567,814 B1 | 5/2003 | Bakier et al. |
| 6,574,618 B2 | 6/2003 | Eylon et al. |
| 6,574,639 B2 | 6/2003 | Carey et al. |
| 6,591,277 B2 | 7/2003 | Spence et al. |
| 6,591,278 B1 | 7/2003 | Ernst |
| 6,598,167 B2 | 7/2003 | Devine et al. |
| 6,606,596 B1 | 8/2003 | Zirngibl et al. |
| 6,640,234 B1 | 10/2003 | Coffen et al. |
| 6,647,272 B1 | 11/2003 | Asikainen |
| 6,651,055 B1 | 11/2003 | Kilmer et al. |
| 6,651,142 B1 | 11/2003 | Gorelik et al. |
| 6,701,485 B1 | 3/2004 | Igra et al. |
| 6,731,314 B1 * | 5/2004 | Cheng et al. ................. 715/848 |
| 6,745,193 B1 | 6/2004 | Horvitz et al. |
| 6,775,267 B1 * | 8/2004 | Kung et al. .................. 370/352 |
| 6,789,083 B2 | 9/2004 | Thelen |
| 6,832,341 B1 | 12/2004 | Vijayan |
| 6,901,592 B2 | 5/2005 | Mar et al. |
| 6,907,422 B1 | 6/2005 | Predovic |
| 6,915,457 B1 | 7/2005 | Miller |
| 6,920,607 B1 | 7/2005 | Ali et al. |
| 6,938,221 B2 | 8/2005 | Nguyen |
| 6,954,902 B2 | 10/2005 | Noma et al. |
| 6,996,768 B1 | 2/2006 | Elo et al. |
| 7,024,474 B2 * | 4/2006 | Clubb et al. ................. 709/223 |
| 7,031,314 B2 | 4/2006 | Craig et al. |
| 7,032,006 B2 | 4/2006 | Zhuk |
| 7,058,953 B2 | 6/2006 | Willard et al. |
| 7,096,432 B2 | 8/2006 | Huapaya et al. |
| 7,113,964 B1 | 9/2006 | Bequet et al. |
| 7,120,139 B1 * | 10/2006 | Kung et al. .................. 370/352 |
| 7,171,473 B1 | 1/2007 | Eftis et al. |
| 7,174,339 B1 | 2/2007 | Wucherer et al. |
| 7,197,565 B2 * | 3/2007 | Abdelaziz et al. ............ 709/226 |
| 7,243,124 B1 | 7/2007 | Gardner et al. |
| 7,272,660 B1 | 9/2007 | Powers et al. |
| 2001/0034733 A1 | 10/2001 | Promt et al. |
| 2001/0039616 A1 | 11/2001 | Kumagai et al. |
| 2001/0049721 A1 | 12/2001 | Blair et al. |
| 2002/0013853 A1 | 1/2002 | Baber et al. |
| 2002/0038217 A1 | 3/2002 | Young |
| 2002/0057678 A1 | 5/2002 | Jiang et al. |
| 2002/0059472 A1 | 5/2002 | Woolrath et al. |
| 2002/0065894 A1 | 5/2002 | Dalal et al. |
| 2002/0078208 A1 | 6/2002 | Crump et al. |
| 2002/0083067 A1 | 6/2002 | Tamayo et al. |
| 2002/0107864 A1 | 8/2002 | Battas et al. |
| 2002/0107905 A1 | 8/2002 | Roe et al. |
| 2002/0107957 A1 | 8/2002 | Zargham .................... 709/224 |
| 2002/0116362 A1 | 8/2002 | Li et al. |
| 2002/0120697 A1 | 8/2002 | Generous et al. |
| 2002/0120765 A1 | 8/2002 | Boehmke |
| 2002/0143710 A1 | 10/2002 | Liu |
| 2002/0152402 A1 | 10/2002 | Tov et al. |
| 2002/0165849 A1 | 11/2002 | Singh et al. |
| 2002/0184187 A1 | 12/2002 | Bakalash et al. |
| 2002/0198985 A1 | 12/2002 | Fraenkel et al. |
| 2003/0004742 A1 | 1/2003 | Palmer et al. |
| 2003/0023691 A1 * | 1/2003 | Knauerhase ................. 709/206 |
| 2003/0028682 A1 | 2/2003 | Sutherland |
| 2003/0028683 A1 | 2/2003 | Yorke et al. |
| 2003/0033329 A1 | 2/2003 | Bergman et al. |
| 2003/0074393 A1 | 4/2003 | Peart |
| 2003/0088633 A1 | 5/2003 | Chiu et al. |
| 2003/0093585 A1 | 5/2003 | Allan |
| 2003/0101201 A1 | 5/2003 | Saylor et al. |
| 2003/0101223 A1 | 5/2003 | Pace et al. |
| 2003/0105837 A1 | 6/2003 | Kamen et al. |
| 2003/0115186 A1 | 6/2003 | Wilkinson |
| 2003/0120805 A1 * | 6/2003 | Couts et al. ................. 709/238 |
| 2003/0154177 A1 | 8/2003 | Holland et al. |

| | | | |
|---|---|---|---|
| 2003/0182428 A1* | 9/2003 | Li et al. ..................... 709/227 |
| 2003/0182461 A1 | 9/2003 | Stelting et al. |
| 2003/0187971 A1 | 10/2003 | Uliano et al. |
| 2003/0204741 A1 | 10/2003 | Schoen et al. |
| 2003/0208543 A1 | 11/2003 | Enete et al. |
| 2003/0217081 A1 | 11/2003 | White et al. |
| 2003/0220860 A1 | 11/2003 | Heytens et al. |
| 2003/0229722 A1 | 12/2003 | Beyda |
| 2003/0235279 A1 | 12/2003 | Richomme |
| 2004/0002958 A1 | 1/2004 | Seshadri et al. |
| 2004/0010543 A1 | 1/2004 | Grobman |
| 2004/0030762 A1 | 2/2004 | Silverthorne et al. |
| 2004/0039776 A1 | 2/2004 | Ballard |
| 2004/0039800 A1 | 2/2004 | Black et al. |
| 2004/0049477 A1 | 3/2004 | Powers et al. |
| 2004/0073596 A1 | 4/2004 | Kloninger et al. |
| 2004/0087300 A1 | 5/2004 | Lewis |
| 2004/0146044 A1 | 7/2004 | Herkerdorf et al. |
| 2004/0152477 A1 | 8/2004 | Wu et al. |
| 2004/0254998 A1 | 12/2004 | Horvitz |
| 2005/0004984 A1 | 1/2005 | Simpson |
| 2005/0055329 A1 | 3/2005 | Bakalash et al. |
| 2005/0086211 A1 | 4/2005 | Mayer |
| 2005/0102294 A1 | 5/2005 | Coldewey |
| 2005/0102611 A1 | 5/2005 | Chen |
| 2006/0089939 A1 | 4/2006 | Broda et al. |
| 2006/0161540 A1 | 7/2006 | Svhmitz et al. |
| 2004/0046803 A1 | 2/2008 | Beauchamp et al. |
| 2008/0043256 A1 | 2/2008 | Broda et al. |
| 2008/0046505 A1 | 2/2008 | Netsch et al. |
| 2008/0046506 A1 | 2/2008 | Broda |
| 2008/0046510 A1 | 2/2008 | Beauchamp et al. |
| 2008/0046536 A1 | 2/2008 | Broda |
| 2008/0046556 A1 | 2/2008 | Nicholls et al. |
| 2008/0046568 A1 | 2/2008 | Broda et al. |
| 2008/0046803 A1 | 2/2008 | Beauchamp et al. |
| 2008/0046837 A1 | 2/2008 | Beauchamp et al. |
| 2008/0077656 A1 | 3/2008 | Broda |

OTHER PUBLICATIONS

"Steel-Belted Radius/Enterprise Edition", Funk Software, Inc., 2004.
"Jabber: About: Technology Overview", Jabber Software Foundation, Dec. 12, 2003.
Jan Smith, "Browser Basics: Printing", Feb. 3, 2003.
Perfetti, Christine and Jared M. Spool, "Macromedia Flash: A New Hope for Web Applications", User Interface Engineering, 2002.
Aaron Weiss, "The Document Object Model Dissected", Jupitermedia Corporation, 2002.
"Protecting the Enterprise for Rogue Protocols", Akonix Systems, Inc., 2002.
"Informatica Applications: Leverage your Enterprise Information for Better Decision Making", Informatica Corporation, 2002.
"Informatica Applications: Informatica Customer Relationship Analytics", Informatica Corporation, 2002.
"Brocade Rapidly Implements Customer and Sales Analytics", Informatica Corporation, 2002.
Howlett, Dennis and Keith Rodgers, "Delivering Value Back to the Business: A Guide to Successful Portal Selection and Implementation", TIBCO Software, 2002.
"Sametime for iSeries 2.5", Lotus Software, IBM Corporation, 2002.
"Business Intelligence Software: Engendering a Quiet Revolution in the Business Place", MicroStrategy, Dec. 20, 2002.
Bob Woods, "CypherGuard Secures MSN, Windows IM", Instant Messaging Planet, JupiterMedia Corporation, Oct. 3, 2002.
"Business Transformation Through End-to-End Integration", IBM, Aug. 2002.
"The Sagent Analytic Advantage", Sagent Technology Inc., May 2002.
Hugh J. Watson, "Recent Developments in Data Warehousing", Communications of the Association for Information Systems, vol. 8, 2001.
"The Business Intelligence Industry's Leading Products and Services", Business Objects, 2001.
Stephen Brewster, "Windowing Systems", Glasgow Interactive Systems Group, 2001.
"Express Communicator", White Paper, ACD Systems Ltd., May 2001.
"Business Rules: Powering Business and E-Business", White Paper, ILOG, May 2001.
"Data Warehousing Tutorial", Paretoanalysts, Dec. 27, 2001.
"The Sagent Performance Story", Sagent Technology, Inc., Oct. 2001.
"Achieving Global Business Visibility with the webMethods Integration Platform", webMethods, Inc., Sep. 2001.
Bernstein, Philip A. and Erhard Rahm, "Data Warehouse Scenarios for Model Management", Microsoft Corporation, 2000.
"Implementing the RosettaNet eBusiness Standard: Automating High-tech Supply Chains using BusinessWare for RosettaNet", Vitria Technology Inc., 2000.
Wang, Wenjie and Jiaying Pan, "Instant Messaging Insight", Computer Science Department, New York University, Nov. 22, 2000.
"X Window System: Getting Started", Stanford University, Oct. 26, 2000.
Mark Day et al., "A Model for Presence and Instant Messaging", Network Working Group, Request for Comments 2778, The Internet Society, Feb. 2000.
"The Basics of Browser", Santa Clara County Office of Education Internet Institute (SCCOE), 1999.
Randy Corke, "Keeping Data Warehouses Current: Automating Incremental Updates With Data Movement", DM Direct, May 1999.
Moran, Brian and Russ Whitney, "Getting to Know OLAP and MDX", Windows IT Pro, Instant Doc #5112, Apr. 1999.
Mark Handley et al., "SIP: Session Initiation Protocol", Network Working Group, Request for Comments 2543, The Internet Society, Mar. 1999.
"MQSeries link for R/3", International Business Machines Corporation, 1998.
"Report of Novelty Search," by Patentec, dated Oct. 16, 2003.
Michael Tsai, "The Personal Computing Paradigm", ATPM Inc., 1998.
Arno Schoedl, "Issues for Implementing User Interface Software", Georgia Institute of Technology, Sep. 26, 1998.
Allan Christian Long et al., "PDA and Gesture Use in Practice: Insights for Designers of Pen-based User Interfaces", University of California at Berkeley, 1997.
"Middleware—The Essential Component for Enterprise Client/Server Applications", International Systems Group, Inc., Feb. 1997.
Nicolas Pioch, "A Short IRC Primer", Jan. 1, 1997.
Constantine Stephanidis et al., "Design Representations and Development Support for User Interface Adaptation", Institute of Computer Science Foundation for Research and Technology, 1995.
"An Introduction to Messaging and Queuing", IBM Corp, Jun. 1995.
"Relational OLAP: An Enterprise-Wide Data Delivery Architecture", Microstrategy, Incorporated, 1994.
"Guidelines for Implementing and Using the NBS Data", Federal Information Processing Standards, Publication 74, Apr. 1, 1981.
"ILOG Views 2D Graphics: The C++ Library for Interactive 2D Graphics", ILOG, date unknown.
"Sametime 3 Features and Benefits", IBM, date unknown.
"Scripting Support for Web Page Printing Sample," Microsoft Corporation, 2004.
"Print Without Pop Up Window Using Javascript," Experts Exchange, posted Nov. 3, 2002.
"Adding Printer Capabilities," Interactivetools.Com, posted Oct. 19, 2002.
Thomas Loo and Martin Honnen, "How Can I Print a Document That is not Currently Loaded Into a Frame or Window," Synop Software, Apr. 24, 2002.
Jake Howlett "Further Control of Printing," Codestore, Jan. 3, 2002.
Steve Cimino, "How Can I Print a Web Page in ASP?," Internet.Com Corp., posted Jul. 27, 2001.
"Javascript: MSIE 5 Unable to Print Child Window," Experts Exchange, posted Jun. 7, 2000.

Andrew Nosenko, "Scripting Support for Web Page Printing," Microsoft Corporation, Mar. 28, 2000.

Ramu Movva and William Lai, "MSN Messenger Service 1.0 Protocol," Internet Draft, Aug. 1999. (19 pages).

Tristan Richardson and Kenneth R. Wood, "The RFB Protocol," ORL Cambridge, Jul. 1998. (26 pages).

Allen Gwinn, "Simple Network Paging Protocol - Version 3 - Two-Way Enhanced," Network Working Group, Oct. 1995. (23 pages).

Jarkko Oikarinen and Darren Reed, "Internet Relay Chat Protocol," Network Working Group, May 1993. (58 pages).

U.S. Appl. No. 10/289,142, filed Nov. 5, 2002, Nicholls et al.

U.S. Appl. No. 10/289,155, filed Nov. 5, 2002, Netsch et al.

U.S. Appl. No. 10/289,231, filed Nov. 5, 2003, Beauchamp et al.

U.S. Appl. No. 10/390,945, filed Mar. 17, 2003, Broda et al.

U.S. Appl. No. 10/390,978, filed Mar. 17, 2003, Beauchamp et al.

U.S. Appl. No. 10/391,073, filed Mar. 17, 2003, Beauchamp et al.

U.S. Appl. No. 10/391,128, filed Mar. 17, 2003, Broda et al.

U.S. Appl. No. 10/391,544, filed Mar. 17, 2003, Broda.

U.S. Appl. No. 10/452,665, filed May 30, 2003, Broda.

U.S. Appl. No. 11/763,134, filed Jun. 14, 2003, Broda.

"Scripting Support for Web Page Printing Sample," Microsoft Corp., 2004.

"Print Without Pop Up Window Using Javascript," Experts Exchange, posted Nov. 3, 2002.

"Adding Printing Capabilities," Interactivetools.com, posted Oct. 19, 2002.

Loo, Thomas et al., "How Can I Print a Document That is Not Currently Loaded Into a Frame or Window?" Synop Software, Apr. 24, 2002.

Howlett, Jake, "Further Control of Printing," Codestore, Jan. 3, 2002.

Cimino, Steve, "How Can I Print a Web Page in ASP?," Internet.com., posted Jul. 27, 2001.

"JavaScript: MSIE 5 Unable to Print Child Window," Experts Exchange, posted Jun. 7, 2000.

Nonsenko, Andrew, "Scripting Support for Web Page Printing," Microsoft Corporation, Mar. 28, 2000.

Movva, Ramu et al., "MSM Messenger Service 1.0 Protocol," Internet Draft, Aug. 1999.

Richardson, Tristan et al., "The RFB Protocol," ORL Cambridge, Jul. 16, 1998.

Gwinn, Allen et al., "Simple Network Paging Protocol - Version 3 - Two-Way Enhanced," Network Working Group, Oct. 1995.

Oikarinen, Jarkko et al., "Internet Relay Chat Protocol," Network Working Group, May 1993.

Using Microsoft Excel 97 Manual. Bestseller Edition. Que Corporation, 1997.

Excel 2000, publ. Microsoft in 1999, screen captures pp. 1-12.

Extensible Markup Language (XML) 1.0 (Second Edition), Oct. 6, 2000, printed from w3.org.

U.S. Appl. No. 12/035,376, filed Feb. 21, 2008.

U.S. Appl. No. 12/039,471, filed Feb. 28, 2008.

U.S. Appl. No. 12/035,376, filed Feb. 21, 2008, Nicholls et al.

U.S. Appl. No. 12/039,471, filed Feb. 28, 2008, Beauchamp et al.

* cited by examiner

APPARATUS AND METHOD FOR INSTANT MESSAGING COLLABORATION

FIELD OF THE INVENTION

The present invention relates generally to the field of computer-facilitated communications; more particularly, to instant messaging between users logged into a computer network.

BACKGROUND

A paramount concern in a modern enterprise is the ability to quickly respond to changing information. Electronic messaging systems such as instant messaging and e-mail have provided convenient tools for contacting people or groups of people efficiently. These systems provide a fast and inexpensive method for individuals to communicate and collaborate. Reliance on electronic communication has increased markedly in recent years. As technology advances, it is certain that organizations will become more dependent on immediate access to information to excel in a competitive environment.

It is also important for members of an organization to be able to effectively share identical screen images in real-time, such as text and graphics, among one or more client computers. Users typically share these images with one another using e-mail or instant message attachments. A practice known as "screen sharing" or "window sharing" is also used to allow for the display of identical information on computer screens or windows which are mutually connected in a distributed system. Nevertheless, these solutions have shortcomings.

For one, instant messaging is not used for screen sharing. Instead, users are typically connected via a slow connect medium, which adversely affects the instantaneous quality of instant messaging. Furthermore, when users send large attachments, there is an overall slowdown in the speed and reliability of their networks as server capacity is consumed at high levels. In addition, instant messaging systems are generally not scalable. There is typically only one path for a message to take over a network, and past systems have lacked the intelligence to find a more optimum path for the instant messages. Consequently, if there is too much traffic on a particular path, the recipient of an instant message may be subjected to a substantial delay.

Still another major shortcoming of existing instant messaging systems is that they do not provide a secure medium for confidential communication. Instant messaging has been traditionally conducted over the Internet, with communications sent via clear text. This type of insecure forum is often unacceptable for high-security business information. Finally, most instant messaging systems cannot track the presence of an individual throughout an organization. If an emergency happens within the organization, for example, there is no way to automatically alert the proper individuals using existing instant messaging technology.

What is needed is a comprehensive instant messaging system that allows for encrypted communication, collaborative screen sharing using the instant messaging system, and extensibility. Furthermore, an instant messaging system that is able to track the presence of individuals within an organization and to alert those individuals automatically if a predetermined event occurs would also be beneficial.

BRIEF DESCRIPTION OF THE DRAWINGS

The present invention will be understood more fully from the detailed description that follows and from the accompanying drawings, which however, should not be taken to limit the invention to the specific embodiments shown, but are for explanation and understanding only.

DETAILED DESCRIPTION

A system and method for instant messaging collaboration is described. In the following description numerous specific details are set forth, such as the architecture of a message center, details regarding particular types of instant messaging collaboration, and the use of the invention for sharing business reports, in order to provide a thorough understanding of the present invention. However, persons having ordinary skill in the computer arts will appreciate that these specific details may not be needed to practice the present invention.

According to one embodiment of the present invention, an instant messaging system is provided that allows users to transmit messages instantaneously to any user located in a list of users contained in the instant messaging system. The system is able to track the presence of users that are using the instant message system within an organization, and to send users alerts about changing information within the organization. For example, if the instant messaging system is used in an oil refinery and there is a dangerous condition occurring in the refinery, an instant message may be sent to the appropriate people within the refinery so that they are able to immediately respond to the event. The system also provides for instant messaging through e-mail if users are not using the instant messaging system.

In one embodiment, the instant messaging system allows users to plug in their own security, such as bit encryption, so that confidential information may be transmitted between users in a highly secure manner. In another embodiment, a proprietary instant messenger allows for peer-to-peer collaboration, completely bypassing a server for instant messaging. In this manner, users of the system may communicate directly with one another and share identical screen images without having to communicate through the Internet, or with any other server, for that matter. If an image on one user's screen changes, this change may be streamed in real-time to all other participants in the instant messaging collaboration. The instant messaging system of the present invention is also extensible, such that message deliveries can be farmed out to back-up servers to send instant messages to users if network traffic necessitates this type of transmission.

Figure 1:
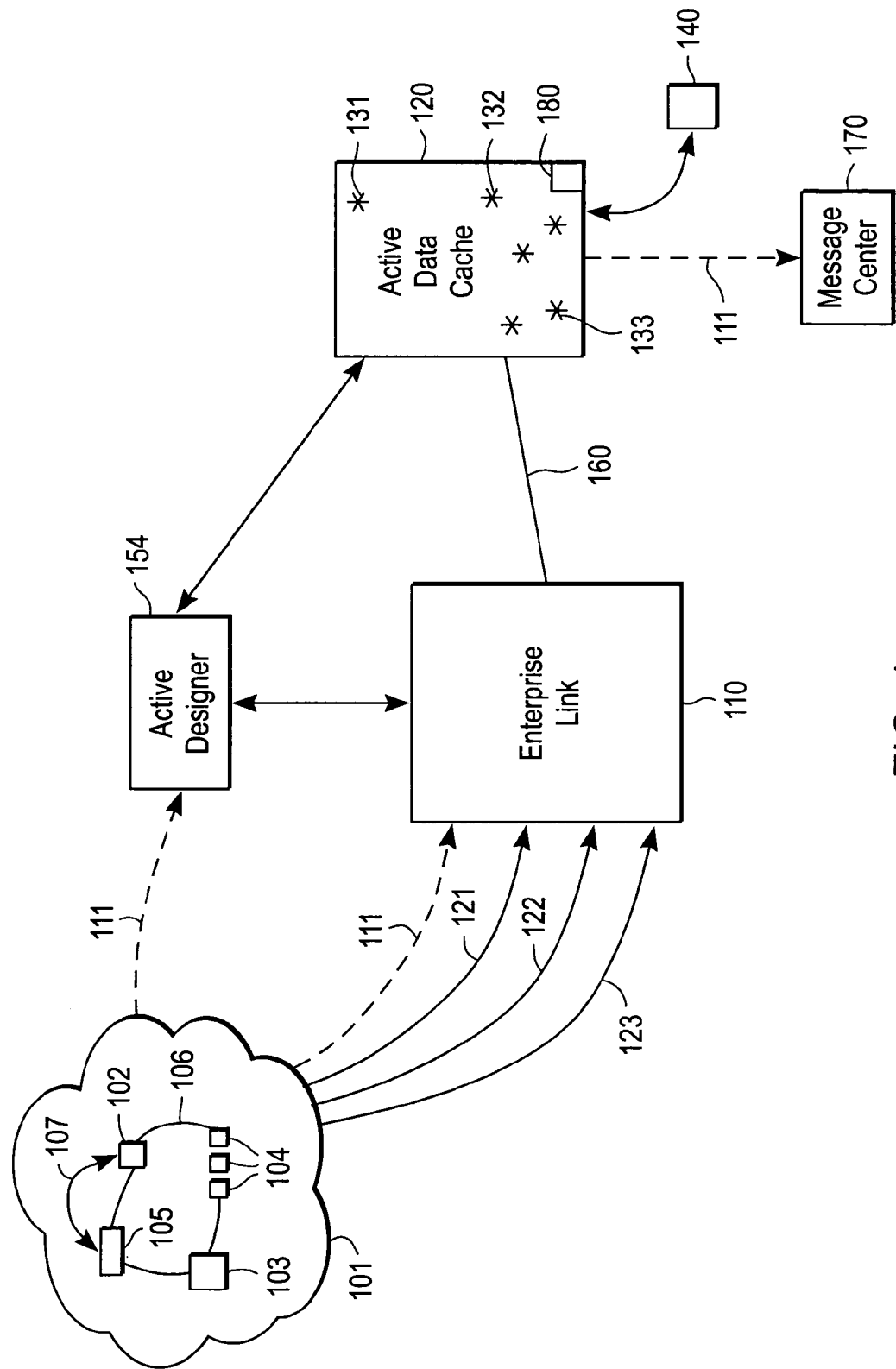
FIG. 1 is a block diagram illustrating an enterprise computing runtime environment according to one embodiment of the present invention.

Referring now to FIG. 1 there is shown a block diagram illustrating an enterprise computing runtime environment according to one embodiment of the present invention. There is shown in FIG. 1 a simplistic view of an enterprise computing runtime environment 101 containing a plurality of enterprise systems that are often utilized in an organization. In FIG. 1, these enterprise systems include "back office" applications 102 for enterprise resource planning (ERP), "front-office" applications 103 for customer relationship management (CRM), customized legacy systems 104, and multi-dimensional/relational database management systems (RDBMS) 105. Of course, a variety of other applications (not shown in this view) may also exist in the enterprise computing runtime environment 101. These disparate systems may be coupled to one another using a local area network (LAN) 106, a wide area network (WAN) or any other such networking environments commonplace in offices, enterprise-wide computer networks, the intranet, and the Internet. Further, network 106 may include a wireless network, such that one or more computers may operate over a wireless LAN.

As is known in the art, the existing enterprise systems contain a variety of different data about the organization. For example, the ERP system 102 may contain data regarding essential business functions including payroll, manufacturing, general ledger, and human resources whereas the CRM system 103 may contain core information regarding the organization's customers. As data in these various systems changes (e.g., a sale is made, a new employee is hired, payroll is processed, etc.), one or more message queueing systems 107 may be used to allow these various applications 102, 103, 104, etc., to exchange information on the data being stored in their systems. To this end, one implementation of the present invention employs a message queue server (e.g., the Microsoft RTM message Queue Server (MSMQ) (not shown in this view) although other message queuing systems may be used as well), to provide loosely-coupled and reliable network (across servers) communication services based on a message-queueing model. In MSMQ, messages are sent to a queue, where the message is retained in storage until it is removed and used by another application. In this manner, loosely-coupled applications can share data to provide an enterprise-wide view of information, such as data and business transactions.

An enterprise link 110 is coupled to the enterprise computing runtime environment 101 through a network connection, such as the Internet 111. Of course, as is noted above, the network connection may also be a LAN, a WAN, a wireless network, or any other system of connections that allows one or more computers to exchange information. The enterprise link 110 integrates, in real-time, the disparate data in the message queues. The enterprise link 110 of the present invention is maintained active. It continuously accepts raw data feeds 121, 122, 123, etc., from the existing enterprise systems, and then reformats, synchronizes, and consolidates the data.

In a traditional model, the data in the message queues is usually processed through the data flow system when a specified number of records have built up within the message queues (i.e., the data is then transmitted in batch mode). According to an algorithm contained within the data flow system of the present invention, however, individual records are processed through to the enterprise link 110 the moment that they appear; that is, the program continuously checks for new messages and handles them in real-time. In this manner, real-time data flow is transmitted through the raw data feeds 121, 122, 123 via the message queues.

It should be noted that although a message queueing system is used in one embodiment, the enterprise link 110 may also obtain data from the enterprise computing runtime environment 101 in a variety of other ways. These sources of data may be, for example, HyperText Transport Protocol ("HTTP") requests and/or Application Programming Interface ("API") calls and/or Web Services calls. In these alternative embodiments, the enterprise link 110 contains a web server (not shown in this view) to process the HTTP requests and/or another application or server to process the API and/or Web Service calls.

Regardless of how the enterprise link 110 receives the raw data feeds (e.g., 121-123) the enterprise link 110 transmits the data it receives from the enterprise computing runtime environment 101 via a network connection 160 to an active data cache (ADC) 120. Alternatively, the data may be transmitted to the ADC 120 via some other connection. The ADC 120 comprises a high-performance, memory-based persistent cache which stores the data (e.g., as shown by stars 131, 132, and 133) it receives from the enterprise link 110. The ADC 120 contains code which may be implemented in software such as Java™, Perl, C++, or other types of programming languages that can be stored on a computer-readable medium (e.g., a disk) to manage the data that is actively changing within the enterprise computing runtime environment 101 and to make the data accessible to the end-user in real-time. In this manner, the data represented by stars 131, 132, and 133 in the ADC 120 is constantly changing such that it is synchronized in real-time with the data in the enterprise computing runtime environment 101. The data 131, 132, and 133 in the ADC 120 may also be made persistent to disk 140, as disk 140 is optionally used for backup, restore, and recovery purposes.

An active designer 154 is the component module of the enterprise link 110 that determines the particular data that is contained within the ADC 120. Active designer 154 determines the process by which the data 131, 132, and 133 is transmitted to the ADC 120. As is shown in FIG. 1, the active designer 154 is also connected to the enterprise computing runtime environment 101 via the Internet 111. The active designer 154 essentially contains one or more lists of data flow definitions that define which operations are to be performed on the data that is transmitted to the active designer 154 through the network connection 111. Again, the code for the data flow definitions may be implemented in software such as JAVA, Perl, C++, C#, or other types of programming languages that can be stored on a computer-readable medium.

By way of example, when sales data arrives at the ERP 102, the active designer 154 may contain a set of data flow definitions on how to retrieve, transform, and display this data. Each data flow definition may include executable software code instructing the enterprise link 110 to retrieve, by way of example, the data within the salesperson field whenever a sale is made, to describe how many sales that salesperson has made for the day, etc., and then to transmit this data to the ADC 120.

In the embodiment of FIG. 1, the ADC 120 is connected to a message center 170 through the Internet 111. Alternatively, connections to the message center 170 may be made through the intranet, a LAN, a WAN, or any of the other conventional network connections. The message center 170 is essentially a broadcast center in that it transmits instant messages about important data that is actively changing within the enterprise computing runtime environment 101. When the ADC 120 receives a transmission about changing data and/or an event that occurred within the enterprise computing runtime environment 101, it transmits this data to an event engine 180. The event engine 180 may be coupled to the ADC 120 through the Internet, the intranet, a LAN, a WAN, or any of the other network connections. The event engine 180 contains an algorithm for determining that an instant message about the particular event needs to be transmitted to the message center 170. If the event engine 180 determines that a message about the particular event must be transmitted to the message center 170, it transmits this data to an Application Programmer's Interface (API) contained within the message center architecture. The message center 170 then executes instantaneous message delivery to one or more users, as will be described in more detail herein. In addition, the message center 170 allows for instant messaging collaboration among one or more users as will also be described herein. A monitoring service such as a switchboard (not shown in this view), may also track a user of the instant messaging system and will notify a user who is a recipient of an instant message.

Figure 2:
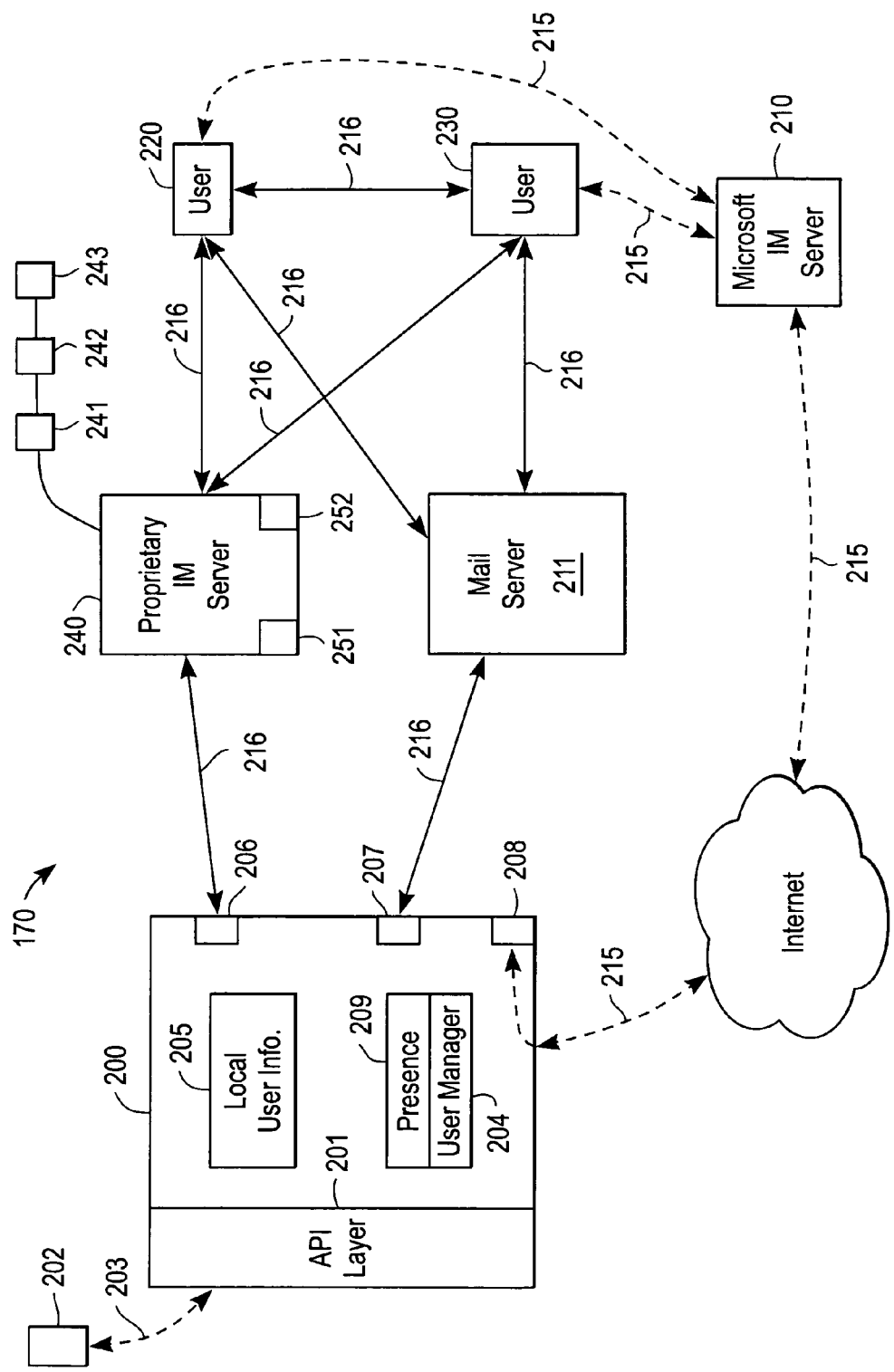
FIG. 2 is a block diagram illustrating message center architecture according to one embodiment of the present invention.

Referring now to FIG. 2 there is shown a block diagram of the message center architecture according to one embodiment of the present invention. The main server component 200 of the message center 170 includes the API layer 201 which may interface with a variety of outside components in an enterprise computing runtime environment through an event engine 202. The event engine 202 may be coupled to the main server component 200 via a network connection 203, such as an intranet or Internet network or any other type of network connection as described herein. The main server component 200 also includes a presence component 209 and a user manager 204. The presence component 209 determines the state of individual instant messenger users 220 and 230; that is, whether users 220 and 230 are on-line or off-line, and variations of how contactable a particular user is. Of course, it should be noted that although only two users 220 and 230 are illustrated in FIG. 2, the number of users may vary. In some instances, hundreds or thousands of users may simultaneously use the instant messaging system described herein.

The presence component 209 may determine, for example, that a user is off-line, and therefore may not receive an instant message. The presence component may also determine that even though a user may not be using instant messaging, that the user has an e-mail address, where the instant message may be sent to be viewed the next time the user checks e-mail. The user manager 204 allows the server component 200 to obtain log-in information for various users. The user manager 204 also maintains lists of users that the server component 200 may communicate with via instant messaging. Local user information 205, including the name and e-mail address of users, may also be contained within the server component 200 of the message center architecture.

A variety of plug-ins 206, 207, and 208, may be connected to the main server component 200 to allow the message center 170 to contact instant messaging users 220 and 230. In the embodiment illustrated by FIG. 2, the plug-ins 206, 207, and 208 include a propietary instant messaging plug-in 206 that interfaces directly with a proprietary instant messaging server 240, and a Simple Mail Transfer Protocol (SMTP) plug-in 207 that interfaces directly with a mail server 211. Of course, a variety of other plug-ins may be used as well. A Microsoft Instant messaging plug-in 208 allows the message center to interface with Microsoft's instant messaging server 210. The server component 200 logs on to Microsoft's instant messaging server 210 as a peer. The server component 200 has its own user that may log into the MIcrosoft instant messaging server 210 through a network connection such as the Internet 215

Components of the enterprise computing runtime environment may use the event engine 202 to transmit messages through the API layer 201 directly to the Microsoft instant messaging server 210 through plug-in 208. The Microsoft instant messaging server 210 may then use the Internet 215 to transmit the instant message to a user 220. For instance, if an instant message needs to be sent to user 220 within an organization, the event engine 202 immediately transmits this message to the server component 200. The user manager 204 resolves the user's e-mail address on the Microsoft instant messaging server 210. The server component 200 employs the presence component 203 to determine whether or not user 220 is on-line. If user 220 is not on-line, then a message is transmitted back to the message center 170 indicating that the user is not on-line and thus cannot be contacted. Alternatively, the server component 200 may send the instant message to the user 220 via e-mail through the SMTP mail protocol plug-in 207 for the user 220 to receive next time the user checks his in-box. If the user 220 is on-line, however, then the plug-in 208 immediately transmits the message via the Internet 215 to the Microsoft instant messaging server 210. The Microsoft instant messaging server 210 then transmits the message to the user 220.

In another embodiment of the present invention, a user 230 may receive instant messages without using the Microsoft instant messaging server 210. For example, the proprietary instant messaging plug-in 206 allows instant messages to be transmitted from the event engine 202 to users who are logged into a proprietary server 240. If a message arrives at the server component 200 from the event engine 202 for the user 230, the user manager 204 is able to resolve the user's 230 e-mail address and transmit the message to the user 230 via the proprietary server 207. In addition, the message center is able to determine how the user 230 is logged on to the system. That is, it recognizes that the user 230 is logged on using the proprietary server 240 and therefore is able to send the message to the user 230 via the proprietary instant messaging plug-in 206.

Instant messages may be sent using the proprietary instant messaging plug-in 206 and the SMTP plug-in 207 simultaneously. Or, alternatively, an algorithm within the server component 200 may contain a set of rules to determine the best mode of instant message transmission. For example, if a message arrives at the message center for user 220, an algorithm may dictate that the instant message first try to be sent via the Microsoft instant messaging server 210, next through the proprietary server 240, and, if this fails, through the SMTP plug-in 207 via the mail server 211.

In another embodiment, an algorithm may be used to try to transmit the instant message through the proprietary server 240 first, the Microsoft instant messaging server 210 second, and the mail server 211 last. The proprietary server 240 may be connected to the server component 200 and to the users 230 and 220 via a standard Transmission Control Protocol/ Internet Protocol (TCP/IP) connection 216. Thus, the proprietary server 240 allows messages to be transmitted using bit-encryption or other highly secure transmission methods. The users 220 and 230 may also be connected to each other via the TCP/IP connections 216 and to the mail server 211 via the TCP/IP connection 216.

In addition, two components of the proprietary server 240 allow for the farming out of network traffic to multiple in-house servers. A presence component 251 of the proprietary server 240 is able to detect the presence of users 220 and 230 of the system, that is, whether or not users 220 and 230 are logged on to the proprietary server 240. A message component 252 of the proprietary server 240, handles message delivery to users 220 and 230.

If multiple messages are transmitted to the proprietary server 240 it may farm them out to back-up servers 241, 242, 243, etc., via the TCP/IP connection 216 located in-house if network traffic is too extensive. In this way, the instant messaging system is scalable. If hundreds of users in an organization need to receive an instant message, these messages may be farmed out to as many back-up servers 241, 242, 243, etc., as necessary and then transmitted to the appropriate users. Furthermore, users 220 and 230 may also communicate directly, without going through a proprietary server 240. This type of direct connection may be brokered by the proprietary server 240. In this case, the proprietary server 240 may set up a direct connection between user 220 and user 230 if the proprietary server is unable to connect to the users 220 and/or 230.

In the example embodiment of FIG. 2, proprietary server 240 may set up a direct connection between user 220 and user 230 using an algorithm. According to the algorithm, the proprietary server 240 sends user 220 the IP address of user 230 (or vice versa). User 220 and user 230 then try to connect directly, bypassing proprietary server 240 for communication. If the communication is successful, the users 220 and 230 partake in instant message collaboration. If not, the instant message may be brokered back to the proprietary server 240. Thus, the instant messaging system can not only provide collaboration to users 220 and 230, the instant messaging system may also find the optimum path for the instant messages to use within the system.

Figure 3:
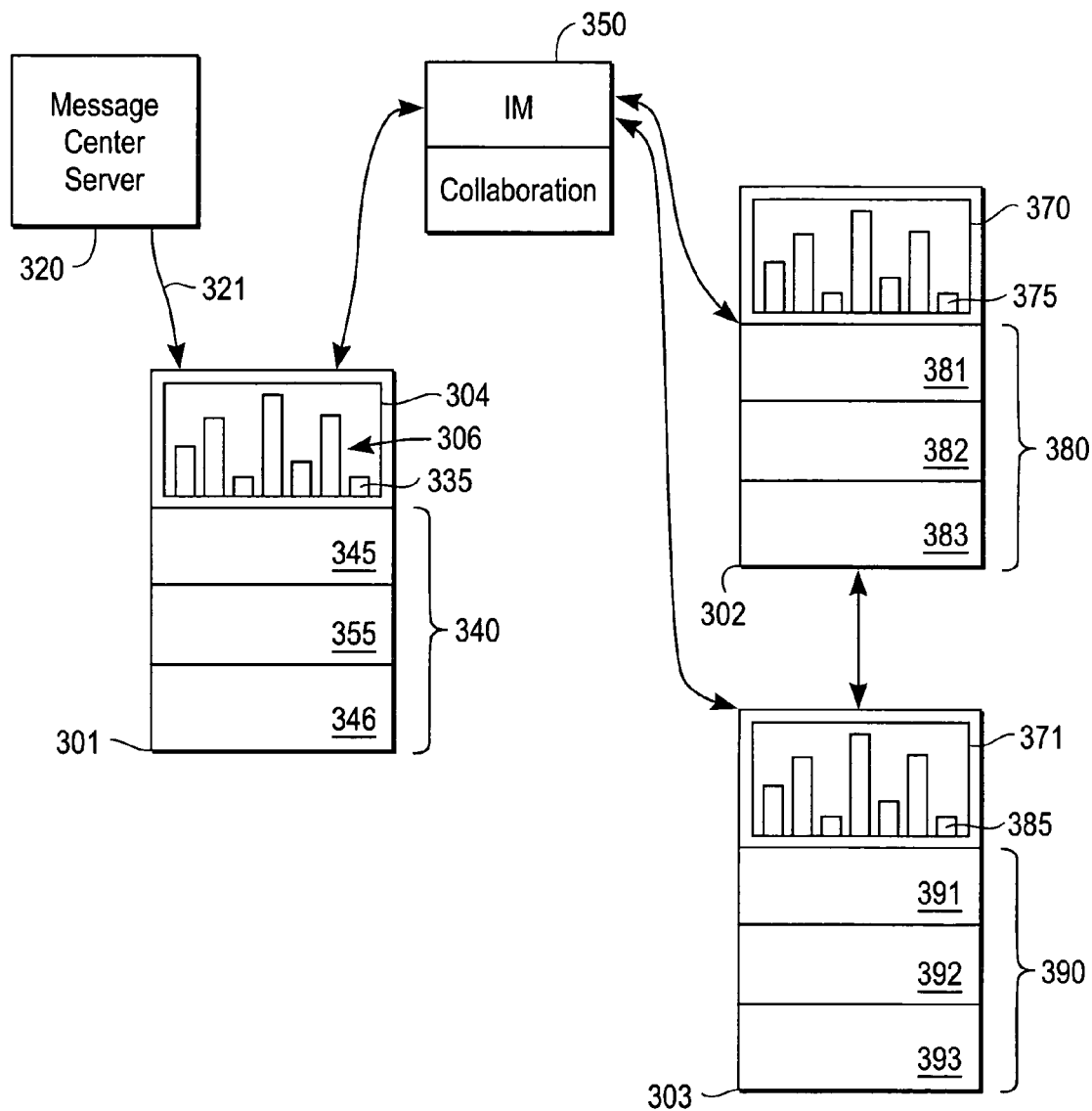
FIG. 3 is a block diagram illustrating instant messaging collaboration according to one embodiment of the present invention.

Referring now to FIG. 3, there is shown a block diagram illustrating instant messaging collaboration according to one embodiment of the present invention. When a user 301 receives a message via the server component 320 of the message center via network connection 321, a chat window or some other icon appears on the user's client computer screen 304. When user 301 selects the chat window, a new window appears on client computer screen 304 which contains data that the sender wants user 301 to see.

In one example, the data may be in the form of a report 306 which is displayed in a specified format, such as a graph. The data may be active. That is, as data changes within the enterprise computing runtime environment these changes are immediately made available to the user 301 (or any user specified by the algorithm contained within the event engine) in real-time via the server component 320 of the message center. At this point, the user's 301 client computer is communicating directly with the server component 320 via connection 321.

Hosted inside the user's 301 client computer is the data. User 301 may click on the chat window to view the data on the user's client computer screen 304. Moreover, the user 301 may share the data with users 302 and 303 via the proprietary server 350. If the user 301 decides to share the data with users 302 and 303, the user 301 may use a viewer 335 to display a drop-down screen 340. A space 345 for text entry in the drop-down screen 340 is provided as well as a conversation window 355 to allow for instant messaging, that is, for "chatting" with users 302 and 303 via the proprietary server 350. The user 301 may send the data comprising the graphical report 306 in the form of an instant message to users 302 and 303 through the proprietary server 350. This message is streamed through the propriety server 350 via the instant messaging protocol. Icons appear on users' 302 and 303 client computer screens 370 and 371, indicating that they are the recipients of an instant message. When the users 302 and 303 click on the icons, they are able to see the exact data, in this example, the graphical report 306, that is shown on user's 301 computer screen. Users 302 and 303 are able to click on their viewers 375 and 385, to display drop-down screens 380 and 390. Spaces for text entry 381 and 391 and conversation windows 382 and 392 may be used to convey messages to users 301, 302, and 303 involved in the instant messaging collaboration in the manner described herein.

In addition, users 301, 302, and 303 are able to annotate the data in real-time in order to make changes to the data or insert comments. As a user 301, for example, annotates the data, the annotated data is streamed in real-time to users 302 and 303 who are involved in the instant messaging collaboration via the proprietary server 350. Furthermore, users 302 and/or 303 may also make changes to the data in real-time, which may be streamed through the proprietary server 350 to the users 301, 302, and 303.

Another feature of the present invention allows for client computers that have pen-enabled data input. For example, a user 301 may circle a portion of the graphical report 306 with a pen-type device coupled to user's 301 client computer. This circle appears in real-time on users' 302 and 303 computer screens in accordance with one embodiment of the present invention. Spaces for pen-enabled entries 346, 383, and 393, such as handwriting recognition windows, may be located on users 301, 302, and 303 drop-down screens 340, 380, and 390. This feature permits instant messaging collaboration to be conducted using tablet personal computers where the main data entry device is not a keyboard but, a pen-type device.

Figure 4:
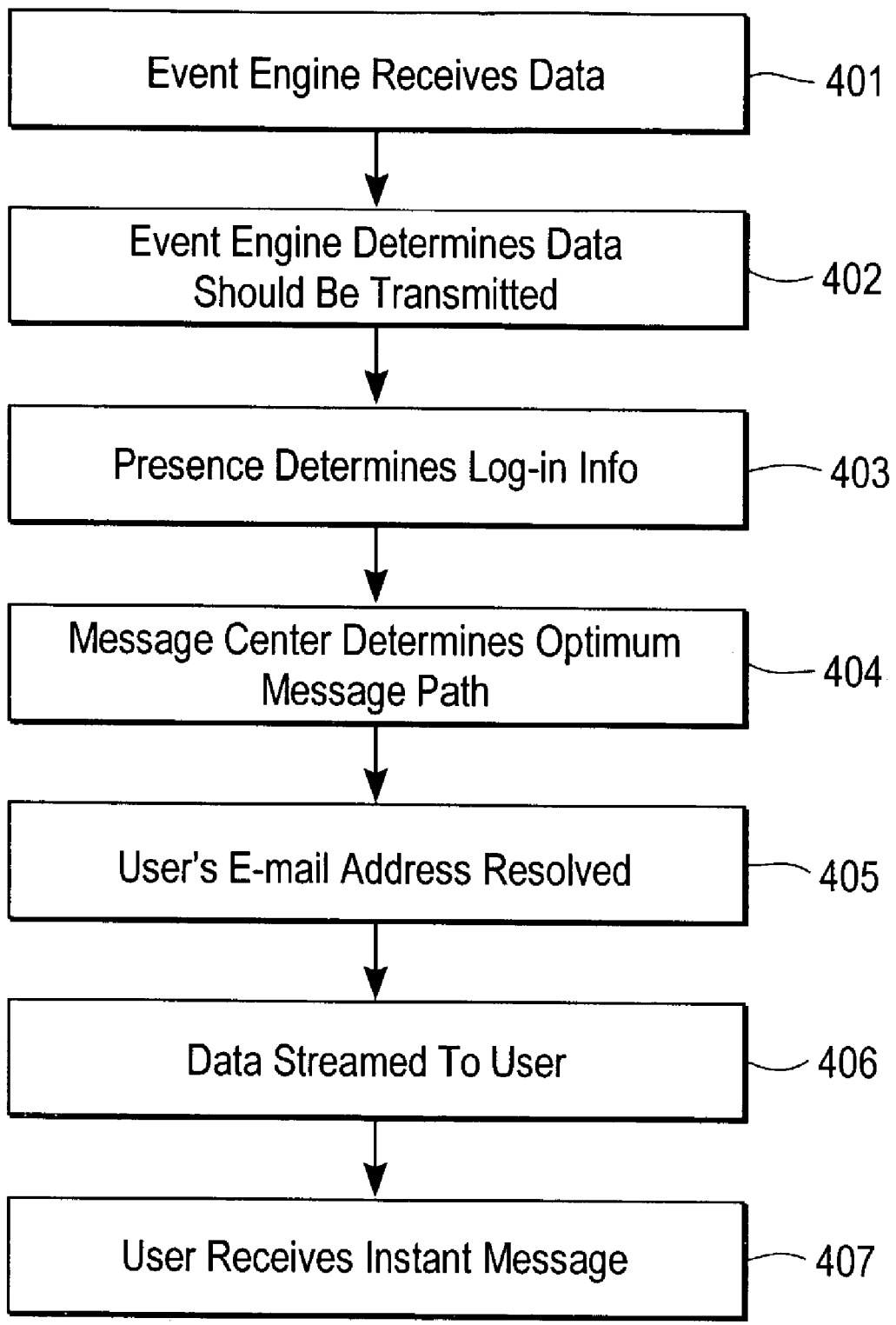
FIG. 4 is a flow chart illustrating the steps of an instant messaging process according to one embodiment of the present invention.

Referring now to FIG. 4, there is shown a flow chart illustrating the steps of an instant messaging process according to one embodiment of the present invention. An event engine receives data in the form of a graphical report from an ADC (block 401). The event engine determines that the data needs to be transmitted instantaneously to a user via the message center (block 402). The presence component of the message center determines that the user is logged on to the Microsoft instant messaging server and the proprietary server (block 403). The message center determines that the optimum path for the data is first through the proprietary server and second through the Microsoft instant messaging server (block 404). The user manager in the message center resolves the user's e-mail address (block 405). The data is streamed to the user in the form of an instant message through the proprietary server via the instant messaging protocol (block 406). The user successfully receives the data in real-time from the proprietary server (block 407).

Figure 5:
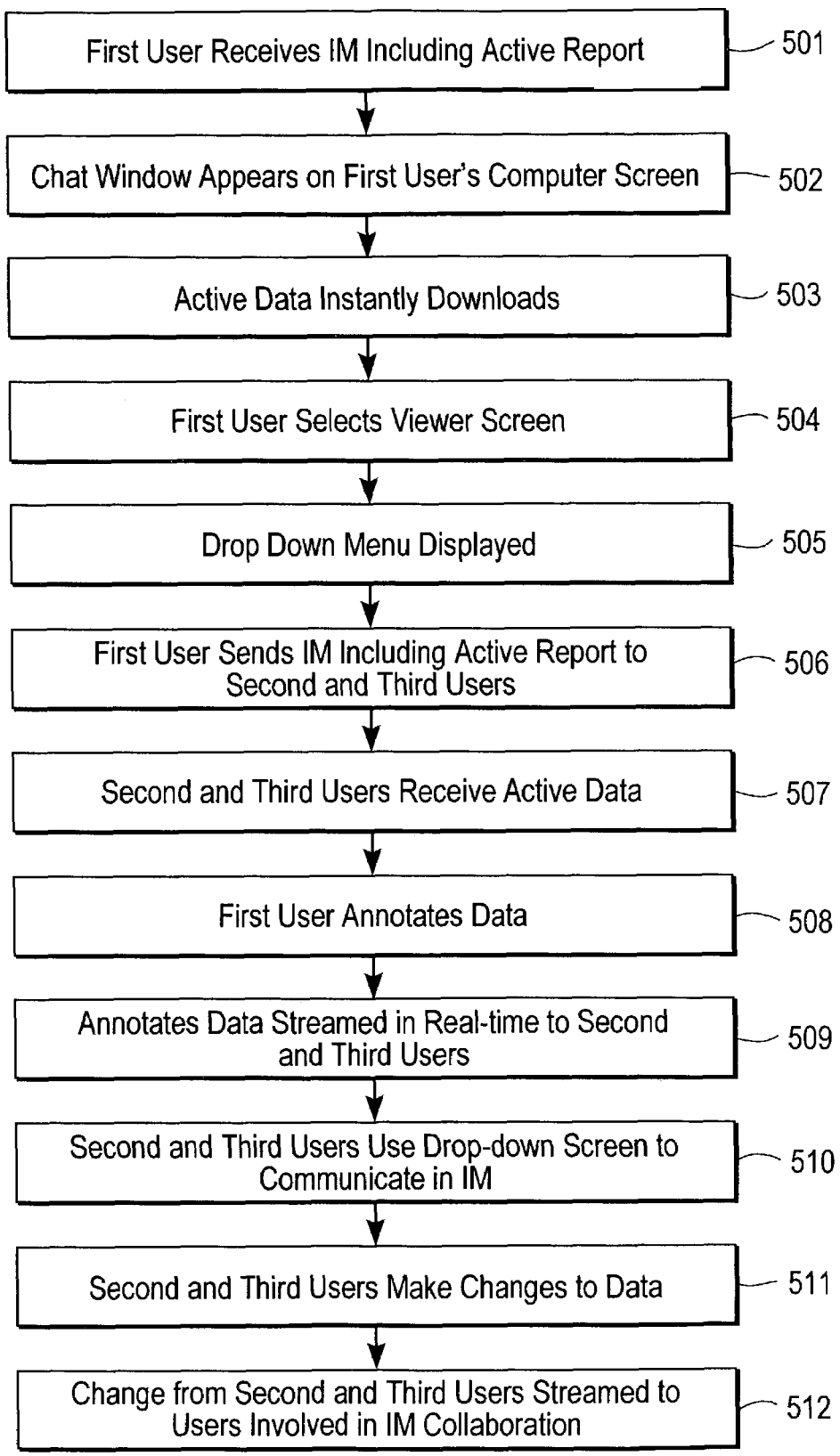
FIG. 5 is a flow chart illustrating the steps of an instant messaging collaboration process according to one embodiment of the present invention.

FIG. 5 is a flow chart illustrating the steps of an instant messaging collaboration process according to one embodiment of the present invention. A first user receives an instant message including an active report from the message center via the proprietary server (block 501). A chat window appears on the first user's client computer screen (block 502). The first user selects the chat window (block 503). Active data in the form of a sales report instantaneously downloads to the first user's computer screen (block 504).

In this example, the first user decides to share the sales report with a second and third user, and thus selects the viewer feature on the user's computer screen (block 505). A drop-down menu is displayed on the first user's computer screen (block 506). The first user utilizes a keypad to type in a message in the conversation window of the drop-down menu and sends this message as well as the sales report to the second and third users through the proprietary server using the instant messaging protocol (block 507).

Continuing with this example, the second and third users receive the exact data that is displayed on the first user's computer screen (block 508). The first user annotates the sales data by using a pen-type device to circle a portion of the data (block 509). This change in the data is instantaneously streamed in real-time to the second and third users (block 510) who are involved in an instant messaging collaboration via the proprietary server with the first user. The second and third users use drop-down menus on their respective computer screens to communicate with the users involved in the collaboration (block 511). The second and third users make changes to the active data report, pen-enabled or otherwise (block 512). These changes are streamed to the users involved in the instant messaging collaboration (block 513).

Figure 6:
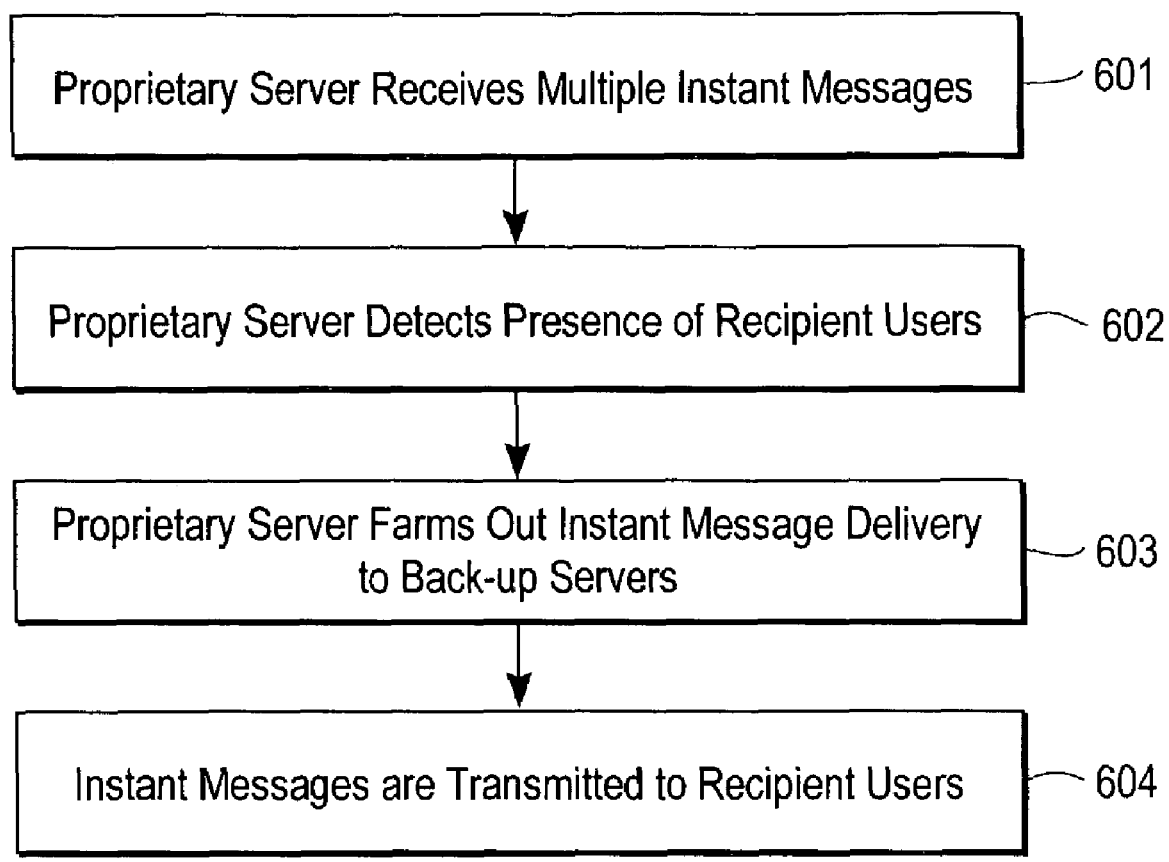
FIG. 6 is a flow chart illustrating one example operation according to one embodiment of the present invention.

A flow chart illustrating one example operation according to one embodiment of the present invention is shown in FIG. 6. A proprietary server receives from the message center multiple instant messages to be received by hundreds of recipient users (block 601). The proprietary server detects the presence of the recipient users who are logged on to the proprietary server (block 602). According to an algorithm contained within the proprietary server, the proprietary server farms out some of the instant messages to second, third, fourth, etc. back-up servers (block 603). The back-up servers transmit the instant messages to recipient users via a message component in the back-up servers (block 605).

Figure 7:
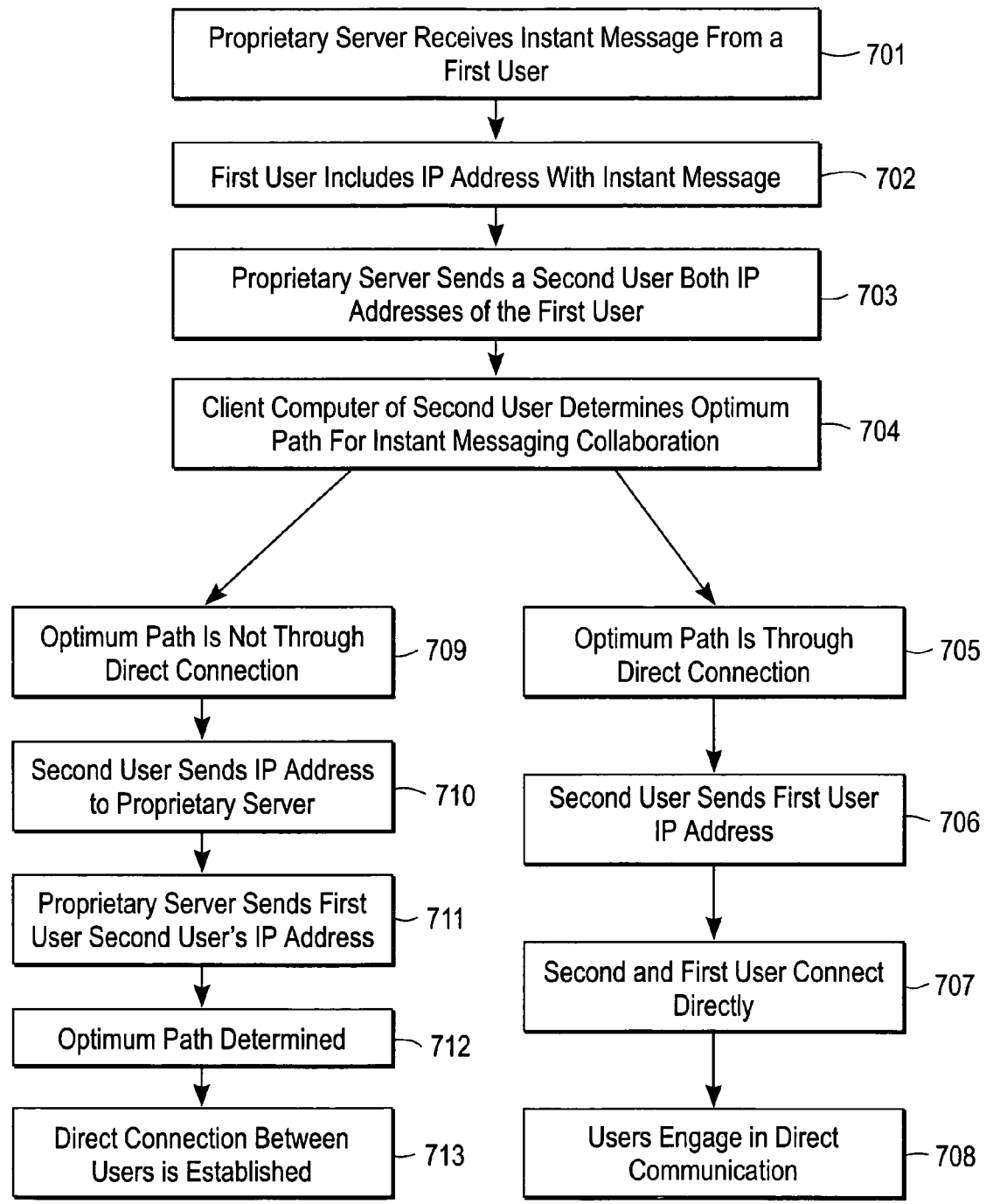
FIG. 7 is a flow chart illustrating the steps of a peer-to-peer instant messaging collaboration process according to one embodiment of the present invention.

FIG. 7 is a flow chart illustrating the steps of a peer-to-peer instant messaging collaboration process according to one embodiment of the present invention. A proprietary server receives an instant message from a first user for a second user (block 701). Since the IP address that the proprietary server has for the first user may be different than the IP address that a peer of the first user would use (because of Network Address Translation (NAT)), the first user also send the proprietary server the IP address of his client computer along with the instant message (block 702). The proprietary server sends the second user both IP addresses of the first user (block 703). According to an algorithm contained within the client computer of the second user, the client computer determines an optimum path for instant messaging collaboration between the first user and the second user (block 704). If the second user determines the optimum path is through direct peer-to-peer collaboration (block 705), the second user sends the first user his IP address (block 706). The second user then connects to the first user directly via the IP address using the TCP/IP connection, completely bypassing the proprietary server (block 707). The users communicate directly, engaging in direct peer-to-peer instant messaging collaboration (block 708) via the TCP/IP connection. Alternatively, if the second user determines that he is unable to directly connect to the first user (block 709), the second user sends the IP address of his client computer to the proprietary server (block 710). The second user's IP address is passed to the first user via the proprietary server (block 711). According to an algorithm contained within the client computer of the first user, an optimum path for instant messaging collaboration is determined (block 712). If the optimum path is a direct connection, the first user and the second user connect directly via the IP address using the TCP/IP connection (block 713).

Figure 8:
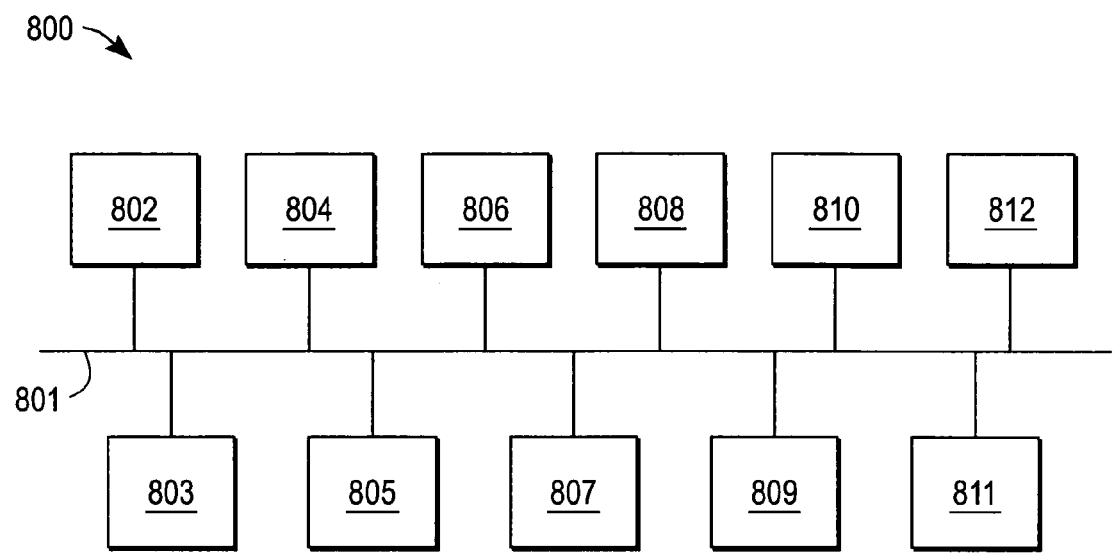
FIG. 8 illustrates a computer system according to one embodiment of the present invention.

Referring now to FIG. 8 there is shown a computer system 800 according to one embodiment of the present invention. The computer system 800 includes a processor 802 that executes a program that includes instructions that cause the algorithm to perform the steps of the invention. The processor 802 is coupled through a bus 801 to a random access memory (RAM) 803, a read only memory (ROM) 804, and a mass storage device 805. The ROM 804 may store the program to execute the steps of the invention. The RAM 803 may be used as an interim storage space for storing an instant message before it is transmitted to a user, or, for example, for storing an instant message before it is downloaded by a user, for example. Mass storage device 805 could be a disk or tape drive for storing data and instructions.

A display device 806 for providing visual output is also coupled to bus 801 for communicating information and command selections to processor 802. Keyboard 807 is coupled to bus 801 for communicating information and command selections to processor 802. Another type of input device is cursor control unit 808, which may be a device such as a mouse or trackball, for communicating direction commands that control cursor movement on display 809.

For example, the cursor control unit 808 may be used to click on a box that will display the instant messages and/or active data transmitted to the computer system 800. Yet another type of input device is a pen-type device 810, for making pen-enabled annotations to a document or for entering messages in handwriting recognition windows (not shown in this view) on drop-down menus on the display 809.

Processor 802 is shown coupled through bus 801 to an input/output (I/O) interface 811, which can be used to control and transfer data to electronic devices connected to computer 800, such as other computers, tape records, and the like.

Network interface device 812 is coupled to bus 801 and provides a physical and logical connection between computer system 800 and network medium, such as the Internet. Depending on the network environment in which computer 800 is used, this connection is typically to a server computer, but it can also be to a network router or to another client computer. Note that the architecture of FIG. 8 is provided only for purposes of illustration, and that a client computer is used in conjunction with the present invention is not limited to this specific architecture.

In the foregoing, a system and method for instant messaging collaboration has been described. Although the present invention has been described with reference to specific exemplary embodiments, it should be understood that numerous changes in the disclosed embodiments can be made in accordance with the disclosure herein without departing from the spirit and scope of the invention. The preceding description, therefore, is not meant to limit the scope of the invention. Rather, the scope of the invention is to be determined only by the appended claims and their equivalents.

We claim:

1. A method comprising:

receiving, by a message center, a transmission from an event engine responsive to a particular event occurring in a computing runtime environment of an enterprise, the transmission containing data synchronized in real-time to data in the computing runtime environment that has changed as a result of the particular event;

determining by a presence component of the message center whether a first user is logged off, or is logged onto a proprietary instant messaging (IM) server of the enterprise via an intranet and is logged onto a third party IM server via the Internet;

executing an algorithm to determine a first optimum transmission path for a message to be sent to the first user, the message including the data changed as a result of the particular event, the first optimum transmission path being one among a plurality of transmission paths that includes a first path through the proprietary IM server, a second path through the third party IM server, and a third path via a mail server;

immediately transmitting the message to the first user via the first optimum transmission path;

determining by a presence component of a message center whether a second user is logged off, or is logged onto the proprietary IM server of the enterprise and is logged onto the third party IM server via the Internet;

determining a second optimum transmission path for the message to be sent to the second user; and immediately transmitting the message to the second user via the second optimum transmission path.

2. The method of claim 1 further comprising:

resolving an e-mail address associated with the first user.

3. The method of claim 1 wherein the first optimum transmission path is provided through the proprietary server.

4. The method of claim 3 further comprising:

encrypting the message prior to transmission to the first user.

5. The method of claim 1 further comprising:

farming out transmission of the message to one or more back-up servers.

6. The method of claim 1 further comprising:

sharing, by the second user, the data contained in the message with at least one additional user in real-time via instant message collaboration.

7. The method of claim 6 wherein the data is streamed in real-time through the proprietary server.

8. A computer program product, comprising a computer useable medium and computer readable code embodied on the computer useable medium, execution of the computer readable code causing the computer program product to:

receive a transmission from an event engine responsive to a particular event occurring in a computing runtime environment of an enterprise, the transmission containing data synchronized in real-time to data in the computing runtime environment that has changed as a result of the particular event;

determine whether each of a plurality of users is logged off, or is logged onto a proprietary instant messaging (IM) server of the enterprise via an intranet and is logged onto a third party IM server via the Internet;

execute an algorithm to determine, for each user, an optimum transmission path for a message to be communicated, the optimum transmission path being either through the proprietary IM server, the third party IM server, or through a mail server; and immediately transmit the message to each user via the optimum transmission path.

9. The computer program product of claim 8 wherein execution of the code further causes the computer program product to encrypt the message prior to transmission.

10. The computer program product of claim 8 wherein execution of the code further causes the computer program product to farm out transmission of the message to one or more users to another server.

11. The computer program product of claim 8 wherein execution of the code further causes the computer program product to resolve an e-mail address associated with each user.

12. The computer program product of claim 8 wherein execution of the code further causes the computer program product to share the data contained in the message with at least one additional user in real-time via instant message collaboration.

* * * * *

UNITED STATES PATENT AND TRADEMARK OFFICE
CERTIFICATE OF CORRECTION

| | | |
|---|---|---|
| PATENT NO. | : 7,401,158 B2 | Page 1 of 2 |
| APPLICATION NO. | : 10/289162 | |
| DATED | : July 15, 2008 | |
| INVENTOR(S) | : Beauchamp et al. | |

It is certified that error appears in the above-identified patent and that said Letters Patent is hereby corrected as shown below:

On the title page, in Assistant Examiner item [74], in column 2, line 1, delete "Vital" and insert -- Vitali --, therefor.

On page 2, in column 2, under "U.S. Patent Documents", line 45, delete "Woolrath et al." and insert -- Wollrath et al. --, therefor.

On page 3, in column 1, under "U.S. Patent Documents", line 27, delete "Svhmitz et al." and insert -- Schmitz et al. --, therefor.

On page 3, in column 1, under "Other Publications", line 10, delete "for" and insert -- from --, therefor.

On page 3, in column 2, under "Other Publications", line 53, delete "Microstrategy," and insert -- MicroStrategy, --, therefor.

On page 4, in column 2, under "Other Publications", line 21, delete "publ." and insert -- publ. by --, therefor.

In column 3, line 30, delete "queueing" and insert -- queuing --, therefor.

In column 3, line 39, delete "queueing" and insert -- queuing --, therefor.

In column 4, line 1, delete "queueing" and insert -- queuing --, therefor.

In column 5, line 53, delete "propietary" and insert -- proprietary --, therefor.

In column 5, line 58, delete "Instant" and insert -- instant --, therefor.

In column 5, line 62, delete "MIcrosoft" and insert -- Microsoft --, therefor.

UNITED STATES PATENT AND TRADEMARK OFFICE
CERTIFICATE OF CORRECTION

PATENT NO. : 7,401,158 B2
APPLICATION NO. : 10/289162
DATED : July 15, 2008
INVENTOR(S) : Beauchamp et al.

It is certified that error appears in the above-identified patent and that said Letters Patent is hereby corrected as shown below:

In column 5, line 64, after "215" insert -- . --.

Signed and Sealed this

Twenty-second Day of December, 2009

David J. Kappos
*Director of the United States Patent and Trademark Office*